(12) United States Patent
Iwasaki

(10) Patent No.: US 7,891,817 B2
(45) Date of Patent: Feb. 22, 2011

(54) PROJECTION DISPLAY APPARATUS FOR REDUCING OPTICAL ELEMENTS

(75) Inventor: Masanori Iwasaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 804 days.

(21) Appl. No.: 11/780,752

(22) Filed: Jul. 20, 2007

(65) Prior Publication Data

US 2008/0174739 A1  Jul. 24, 2008

(30) Foreign Application Priority Data

Jul. 28, 2006  (JP) .............................. 2006-206734

(51) Int. Cl.
*G03B 21/00* (2006.01)
(52) U.S. Cl. .......................... 353/31; 353/77
(58) Field of Classification Search .................. 353/30, 353/31, 37, 77, 81, 98
See application file for complete search history.

(56) References Cited

U.S. PATENT DOCUMENTS

| | | | | |
|---|---|---|---|---|
| 4,560,862 A | * | 12/1985 | Eastman et al. | 235/462.22 |
| 5,716,118 A | * | 2/1998 | Sato et al. | 353/98 |
| 6,612,703 B2 | * | 9/2003 | Lowenthal et al. | 353/31 |
| 7,379,411 B2 | * | 5/2008 | Tada et al. | 369/112.23 |
| 7,675,013 B2 | * | 3/2010 | Kobayashi et al. | 250/205 |
| 2004/0061853 A1 | * | 4/2004 | Blasenheim | 356/318 |
| 2006/0181756 A1 | * | 8/2006 | Yamazaki | 359/212 |

FOREIGN PATENT DOCUMENTS

JP  2006-11259  1/2006

* cited by examiner

*Primary Examiner*—Thanh X Luu
(74) *Attorney, Agent, or Firm*—Oblon, Spivak, McClelland, Maier & Neustadt, L.L.P.

(57) ABSTRACT

A projection display apparatus that projects an image on a screen includes at least three light sources that emit light beams of different wavelengths, at least three optical units that convert the light beams emitted from the at least three light sources into substantially collimated light beams, a beam-combining unit that combines the light beams received at different angles from the at least three optical units into a single beam of light, and a scanning unit that scans the beam emitted from the beam-combining unit so as to allow the beam to enter the screen.

13 Claims, 7 Drawing Sheets

PROJECTION DISPLAY APPARATUS FOR REDUCING OPTICAL ELEMENTS

CROSS REFERENCES TO RELATED APPLICATIONS

The present invention contains subject matter related to Japanese Patent Application JP 2006-206734 filed in the Japanese Patent Office on Jul. 28, 2006, the entire contents of which are incorporated herein by reference.

BACKGROUND OF THE INVENTION

1. Field of the Invention

The present invention relates to rear-projection display apparatuses that scan light beams to project images on screens.

2. Description of the Related Art

Generally, a typical rear-projection display apparatus of related art that projects an image on a screen from a front side or rear side thereof is equipped with, for example, dichroic mirrors as optical units for combining R light, G light, and B light so that a full-color image can be projected onto the screen.

Japanese Unexamined Patent Application Publication No. 2006-11259 discloses an example of a color projection image display apparatus equipped with a light source that generates R light, a light source that generates G light, a light source that generates B light, a dichroic mirror that reflects R light, a dichroic mirror that reflects G light but transmits R light, a dichroic mirror that reflects B light but transmits R light and G light, and a light-source driving circuit. The light-source driving circuit drives each light source to adjust the emission intensity thereof in accordance with a video signal so as to form a one-dimensional image of the corresponding color.

SUMMARY OF THE INVENTION

However, the apparatus of the related art has an excessive number of optical systems for combining R light, G light, and B light, which resulted in a complicated structure.

Accordingly, it is desirable to provide a projection display apparatus that allows for display of full-color images on a screen through a simplified structure.

According to an embodiment of the present invention, there is provided a projection display apparatus that projects an image on a screen, the apparatus including at least three light sources that emit light beams of different wavelengths, at least three optical units that convert the light beams emitted from the at least three light sources into substantially collimated light beams, a beam-combining unit that combines the light beams received at different angles from the at least three optical units into a single beam of light, and a scanning unit that scans the beam emitted from the beam-combining unit so as to allow the beam to enter the screen.

According to the embodiment of the present invention, full-color images can be displayed on the screen through a simple-structured optical system.

DESCRIPTION OF THE PREFERRED EMBODIMENTS

Embodiments of the present invention will now be described with reference to the drawings.

Figure 1:
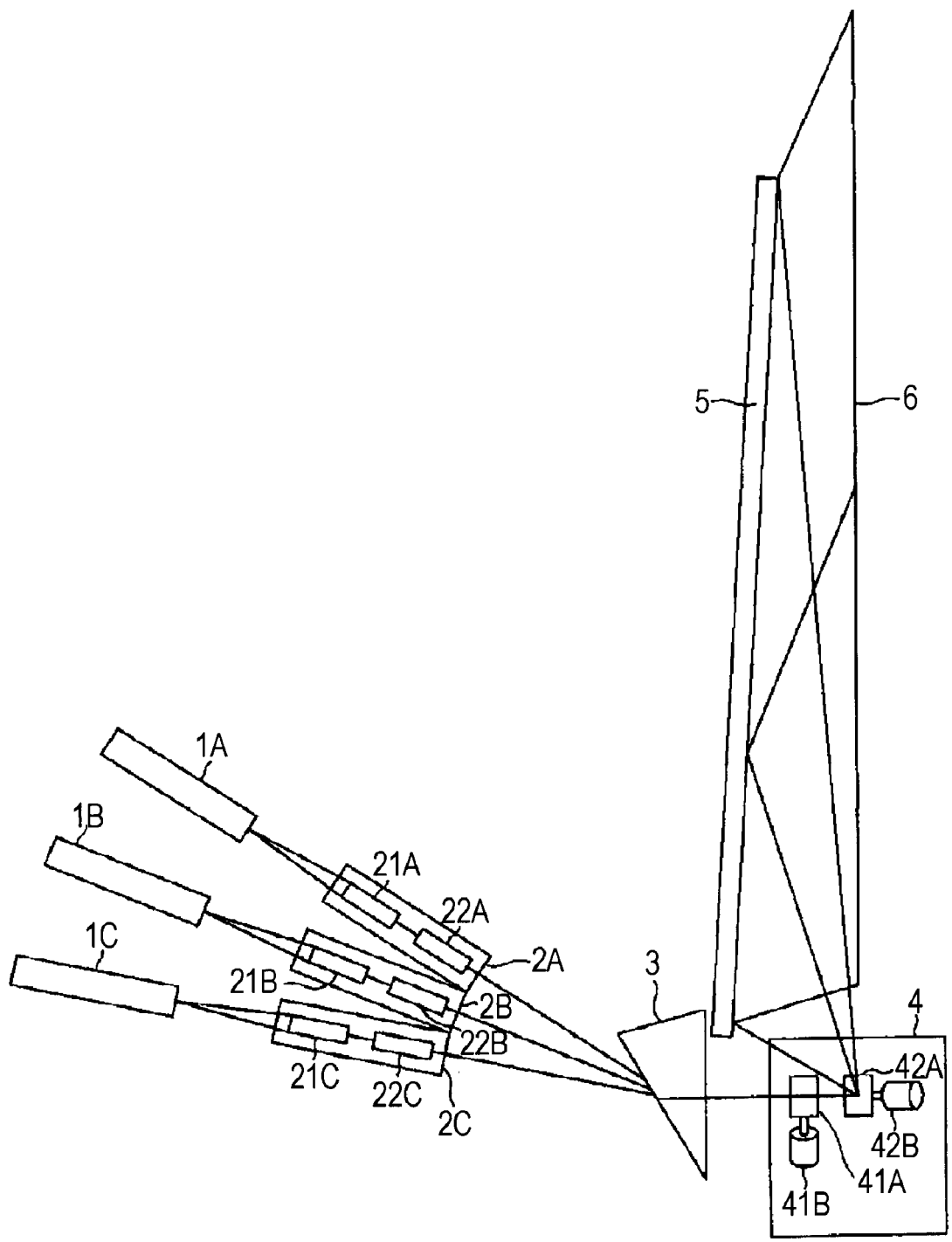
FIG. 1 illustrates an internal structure of a rear-projection display apparatus according to a first embodiment of the present invention.

FIG. 1 illustrates an internal structure of a rear-projection display apparatus 100 according to a first embodiment of the present invention. The rear-projection display apparatus 100 includes a light source 1A that emits R light, a light source 1B that emits G light, a light source 1C that emits B light, an optical unit 2A having a beam-shaping optical element 21A and a beam-converting optical element 22A, an optical unit 2B having a beam-shaping optical element 21B and a beam-converting optical element 22B, an optical unit 2C having a beam-shaping optical element 21C and a beam-converting optical element 22C, a beam-combining element 3, a scanning unit 4, a light-guiding mirror 5, and a screen 6. The light-guiding mirror 5 is for guiding light to the screen 6.

Figure 2:
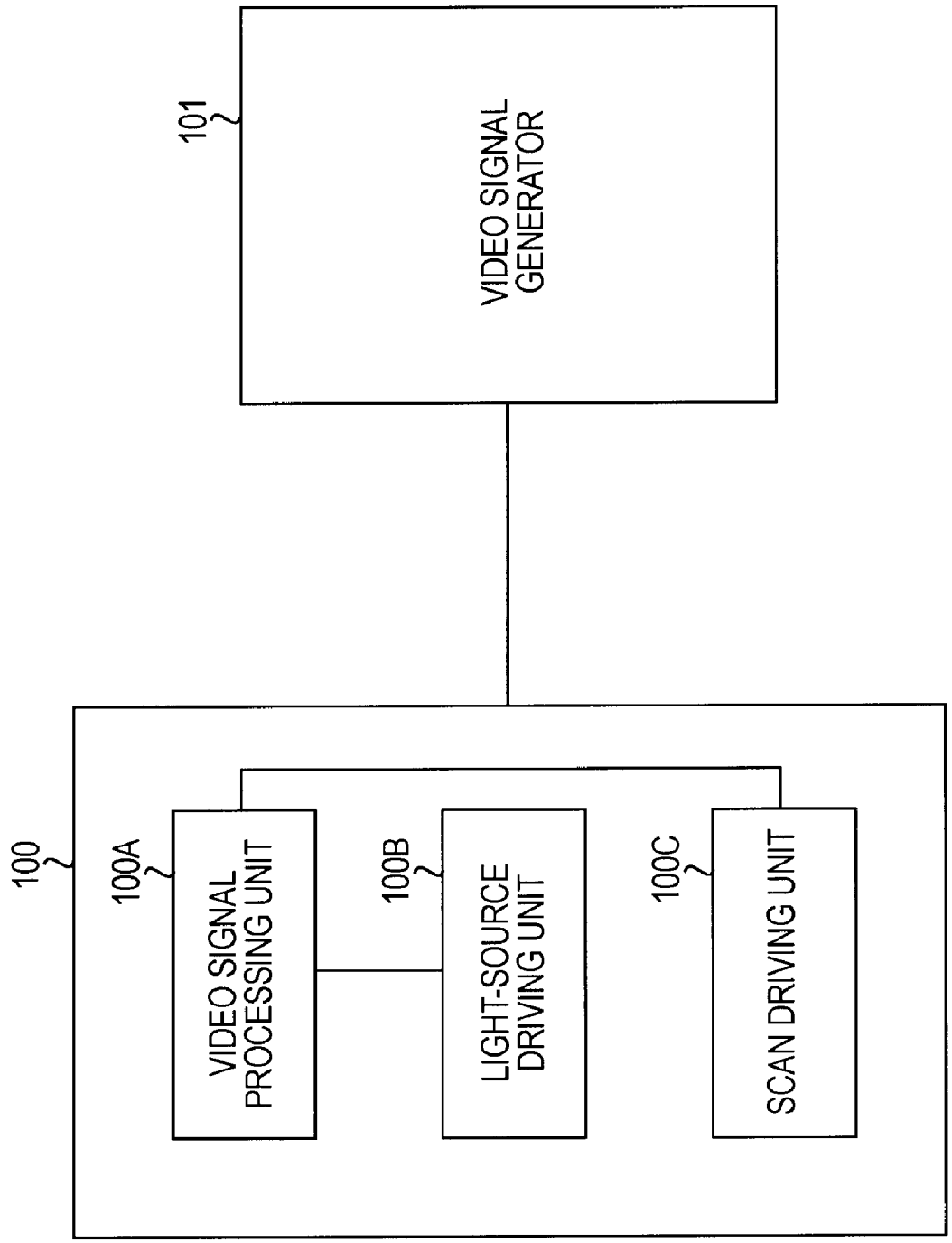
FIG. 2 illustrates a system configuration of the rear-projection display apparatus according to the first embodiment of the present invention.

FIG. 2 illustrates a system configuration of the rear-projection display apparatus 100. The rear-projection display apparatus 100 is connected to a video-signal generator 101, such as a video player, a video camera, a video recorder, a broadcast tuner, or the Internet, so as to receive various video signals. The rear-projection display apparatus 100 includes a video-signal processing unit 100A that processes a video signal received from the video-signal generator 101, a light-source driving unit 100B that drives the light sources 1 on the basis of the video signal, and a scan driving unit 100C that drives the scanning unit 4 on the basis of the video signal.

Each of the light sources 1A, 1B, 1C directly modulates a laser beam from a semiconductor laser before emission. The light sources 1A, 1B, and 1C respectively emit R light, G light, and B light, which are laser beams from the semiconductor lasers modulated at arbitrary divergence angles. Since the divergence angles of the laser beams from the semiconductor lasers vary in horizontal and vertical directions, the beams have an elliptical cross section.

As an alternative to semiconductor lasers, the light sources 1A, 1B, 1C may include, for example, gas lasers, solid-state lasers, or light-emitting diodes. The optical units 2A, 2B, 2C each include a cylindrical lens and a convex lens, but may alternatively include, for example, a prism.

The laser beam of R light emitted from the light source 1A enters the beam-shaping optical element 21A where the elliptical cross section of the beam is shaped into a circular cross section. The R-light laser beam with the circular-shaped cross section enters the beam-converting optical element 22A where the beam is converted to a substantially collimated beam with a cross-sectional diameter of 1 mm or less. The substantially collimated beam emitted from the beam-converting optical element 22A then enters the beam-combining element 3.

Similarly, the laser beam of G light emitted from the light source 1B enters the beam-shaping optical element 21B where the elliptical cross section of the beam is shaped into a circular cross section. The G-light laser beam with the circular-shaped cross section enters the beam-converting optical element 22B where the beam is converted to a substantially collimated beam with a cross-sectional diameter of 1 mm or less. The substantially collimated beam emitted from the beam-converting optical element 22B then enters the beam-combining element 3.

Likewise, the laser beam of B light emitted from the light source 1C enters the beam-shaping optical element 21C where the elliptical cross section of the beam is shaped into a circular cross section. The B-light laser beam with the circular-shaped cross section enters the beam-converting optical element 22C where the beam is converted to a substantially collimated beam with a cross-sectional diameter of 1 mm or less. The substantially collimated beam emitted from the beam-converting optical element 22C then enters the beam-combining element 3.

The laser beams of different wavelengths emitted from the beam-converting optical elements 22A, 22B, and 22C will be referred to as laser beams A, B, and C, respectively. In this case, the laser beams A, B, and C enter the beam-combining element 3 at different angles.

The laser beams A, B, and C incident on the beam-combining element 3 at different angles are combined into a single beam of light that travels on a single light path. The beam of light is subsequently reflected by the scanning unit 4.

The scanning unit 4 includes a reflecting mirror 41A, a scan driving portion 41B that drives the reflecting mirror 41A so as to scan the laser light over the screen 6 in the vertical direction thereof, a reflecting mirror 42A, and a scan driving portion 42B that drives the reflecting mirror 42A so as to scan the laser light over the screen 6 in the horizontal direction thereof. The scan driving portion 41B and the scan driving portion 42B correspond to the scan driving unit 100C. In the scanning unit 4, the reflecting mirrors may be replaced with, for example, prisms.

The light-guiding mirror 5 reflects the laser light scanned by the scanning unit 4 so as to allow the laser light to enter the screen 6 in the vertical and horizontal directions thereof.

An image is displayed on the screen 6 on the basis of the scanning of the laser light performed by the scanning unit 4. In the rear-projection display apparatus 100 illustrated at FIG. 1, the image may be displayed on either a front or a back of the screen 6.

A description below will be directed to a case where the beam-combining element 3 is defined by a prism.

Figure 3:
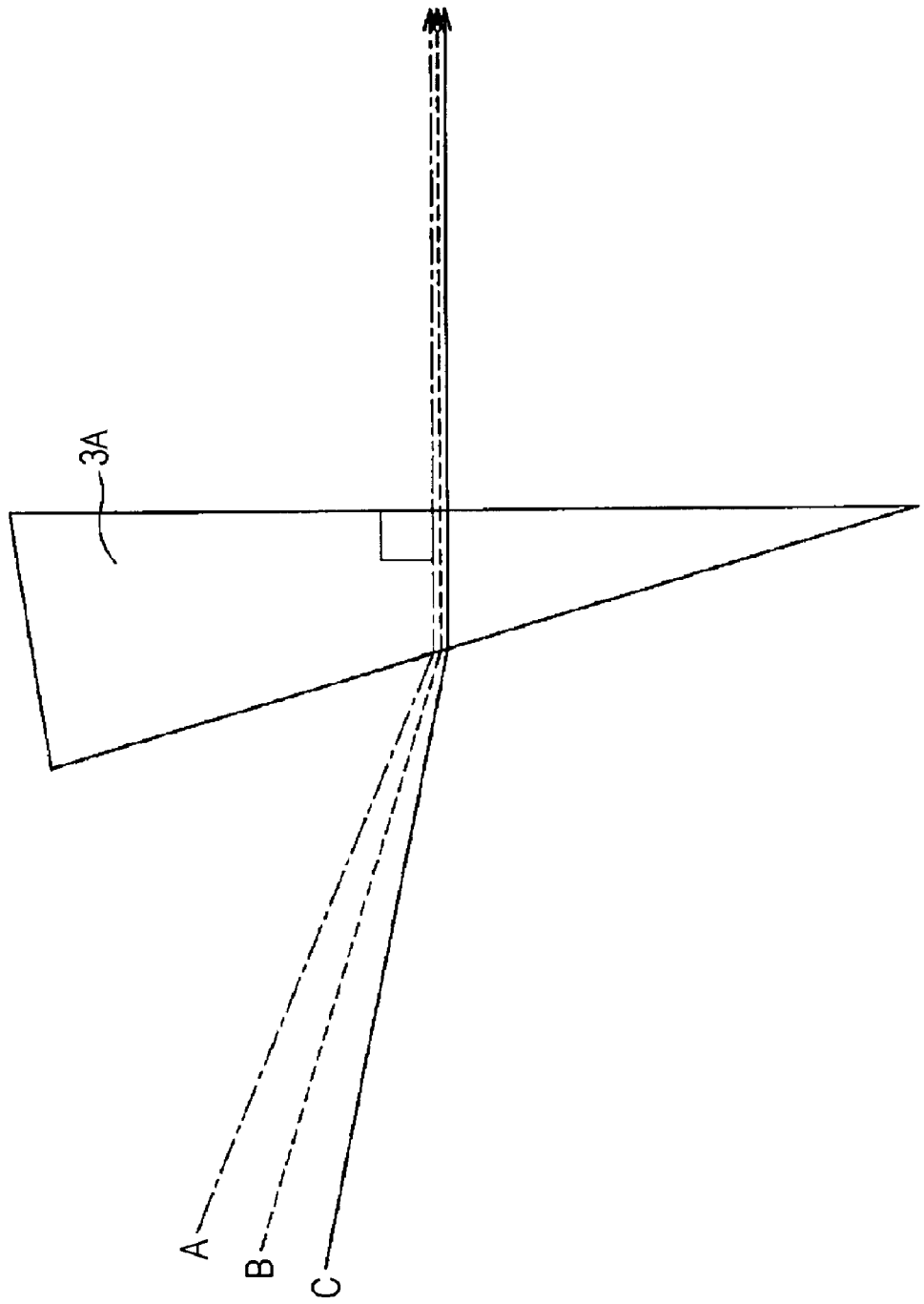
FIG. 3 illustrates a beam-combining prism.

Referring to FIG. 3, the laser beams A, B, C emitted from the optical units 2A, 2B, 2C enter a beam-combining prism 3A. The laser beams incident on the beam-combining prism 3A are combined on a single light path. By setting this light path perpendicular to an exit face of the beam-combining prism 3A, the combined beam can be emitted perpendicularly from the beam-combining prism 3A.

Figure 4:
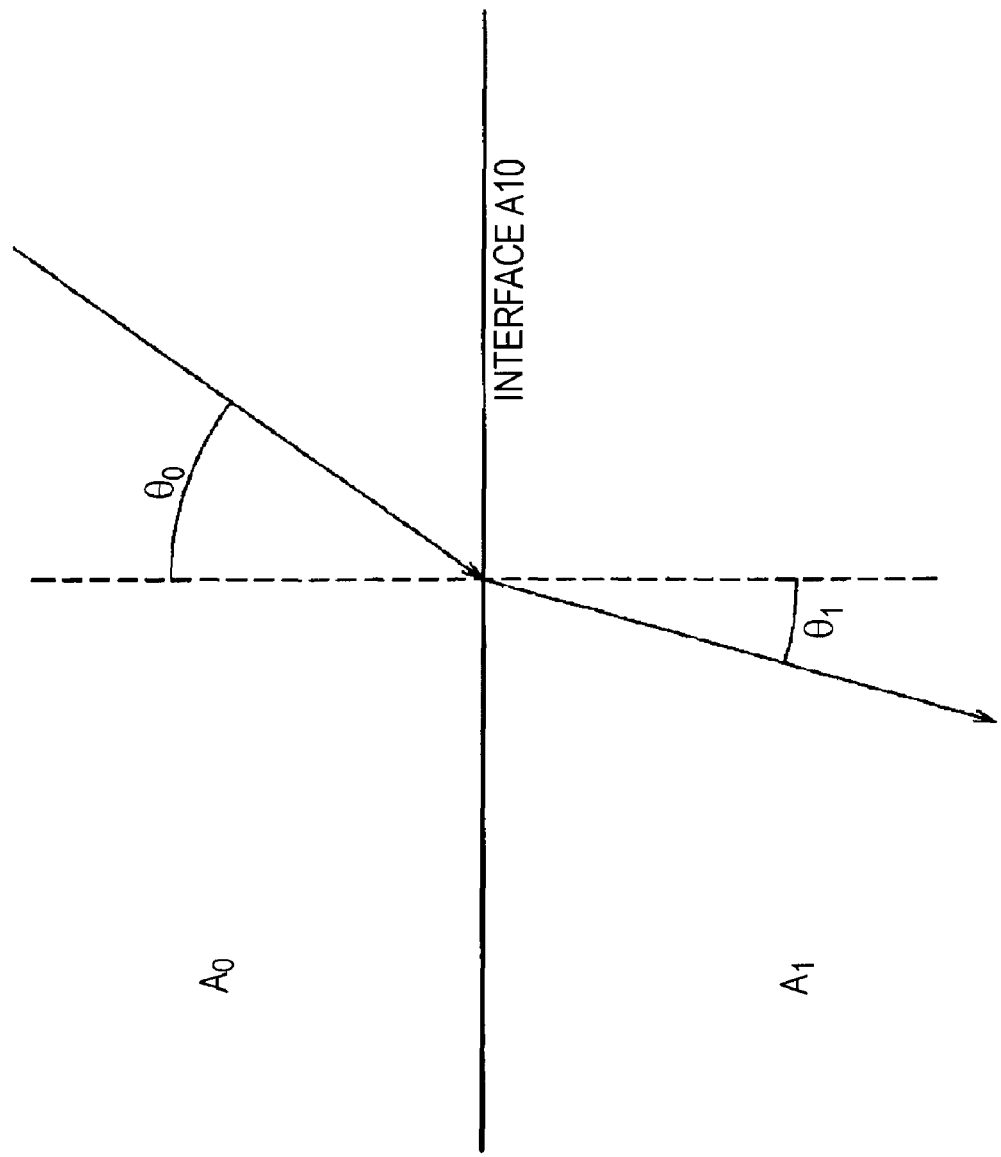
FIG. 4 illustrates a technique for calculating the angle of incidence of a beam incident on the beam-combining prism.

A technique for calculating the angle of incidence of a beam incident on the beam-combining prism 3A will be described below. Referring to FIG. 4, reference character A10 indicates an interface between a medium $A_0$ with a refractive index $n_0$ for a beam and a medium $A_1$ with a refractive index $n_1$ for a beam, reference symbol $\theta_0$ indicates an incidence angle of a beam entering the interface A10 from the medium $A_0$, and reference symbol $\theta_1$ indicates an emission angle of a beam exiting from the interface A10 into the medium $A_1$. Based on Snell's law, the following formula (1) holds:

$$n_0 \times \sin\theta_0 = n_1 \times \sin\theta_1 \tag{1}$$

The beam-combining prism 3A combines the light paths of the beams A, B, and C having different wavelengths into a single light path. Generally, concerning light beams traveling through the same medium, the shorter the wavelength, the greater the refractive index. Accordingly, if the wavelengths of the beams A, B, C are represented as $\lambda_A$, $\lambda_B$, $\lambda_C$ and the refractive indices $n_1$ of the beams A, B, C in the medium $A_1$ are represented as $n_{1A}$, $n_{1B}$, $n_{1C}$, respectively, the condition $n_{1A} < n_{1B} < n_{1C}$ holds when $\lambda_C < \lambda_B < \lambda_A$.

The angle $\theta_0$ in formula (1) can be calculated with the following formula (2):

$$\theta_0 = K \sin(n_1/n_0 \times \sin\theta_1) (K \text{ being a constant}) \tag{2}$$

In order to combine the beams A, B, and C on a single light path, an incidence angle $\theta_{0A}$ of the beam A, an incidence angle $\theta_{0B}$ of the beam B, and an incidence angle $\theta_{0C}$ of the beam C are calculated based on formula (2) so that an emission angle $\theta_{1A}$ of the beam A, an emission angle $\theta_{1B}$ of the beam B, and an emission angle $\theta_{1C}$ of the beam C are the same value under the condition $n_{1A} < n_{1B} < n_{1C}$.

Accordingly, in order to combine the beams A, B, and C on a single light path, it is preferable that the incidence angles of the beams A, B, and C on the beam-combining element 3 satisfy the condition $\theta_{0A} < \theta_{0B} < \theta_{0C}$.

A technique for calculating the angle of incidence of a beam incident on the beam-combining element 3 in a case where the beam-combining element 3 is defined by a diffraction grating will be described below.

Figure 5:
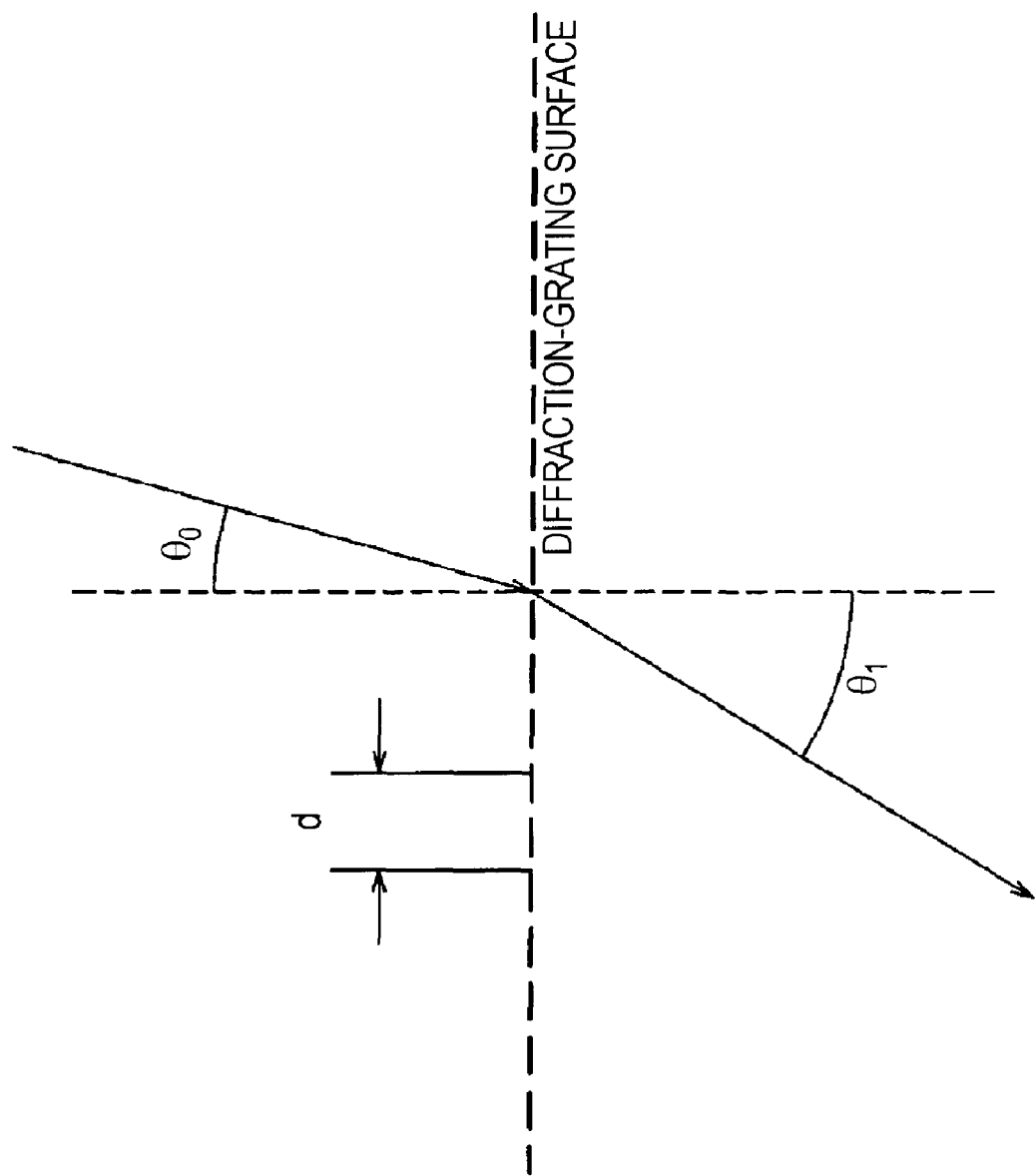
FIG. 5 illustrates a technique for calculating the angle of incidence of a beam incident on a diffraction grating.

Referring to FIG. 5, a relationship between an incidence angle $\theta_0$ and an emission angle $\theta_1$ of a beam having a wavelength $\lambda$ with respect to the diffraction grating can be expressed with the following formula (3):

$$\sin\theta_1 - \sin\theta_0 = n\lambda/d \tag{3}$$

where n represents the order of diffraction, and d represents the lattice spacing of the diffraction grating. In this case, both n and d are constants.

When a diffraction grating is used as the beam-combining element 3, the angles $\theta_{1A}$, $\theta_{1B}$, and $\theta_{1C}$ are preferably set to be the same value based on formula (3) in order to combine the beams A, B, and C on a single light path, as in the above-described case where the beam-combining element 3 is defined by a prism.

Based on formula (3), angles $\theta_{0A}$, $\theta_{0B}$, $\theta_{0C}$ for allowing the angles $\theta_{1A}$, $\theta_{1B}$, $\theta_{1C}$ to be the same value under the condition $\lambda_C < \lambda_B < \lambda_A$ are calculated, thereby determining an incidence angle $\theta_{0A}$ of the beam A, an incidence angle $\theta_{0B}$ of the beam B, and an incidence angle $\theta_{0C}$ of the beam C for allowing the beams to be aligned on the same light path.

In this case, in order to combine the beams A, B, and C on a single light path, it is preferable that the incidence angles of the beams A, B, and C on the beam-combining element 3 satisfy the condition $\theta_{0A} < \theta_{0B} < \theta_{0C}$.

The diffraction grating used as the beam-combining element 3 may be of, for example, a grating type, a slit type, or a volume type.

In the rear-projection display apparatus 100, the length of the light-guiding mirror 5 in the height direction thereof is set equal to or more than half the length of the screen 6 in the height direction thereof. Thus, the angle of incidence of light on the screen 6 in the rear-projection display apparatus 100 can be reduced as compared to that in a rear-projection display apparatus of related art.

In the rear-projection display apparatus 100 according to the first embodiment of the present invention described above, the depth behind the screen can be significantly reduced as compared to that in a rear-projection display apparatus of related art.

In addition, because the angle of incidence of light incident on the screen in the rear-projection display apparatus 100 can be reduced as compared to that in a rear-projection display apparatus of related art, the screen can provide a wider angle of view.

Furthermore, the rear-projection display apparatus 100 allows for display of full-color images on the screen through an optical system having a simpler structure as compared to that in a rear-projection display apparatus of related art.

Unlike a cube prism formed of two to four bonded prism components used in a rear-projection display apparatus of related art, the beam-combining element 3 used in the rear-projection display apparatus 100 has a simple structure with no bonded prism components. In the case of the prism having bonded prism components as in the related art, high precision is necessary. Moreover, the bonded surfaces preferably have an expensive reflective film disposed therebetween for wavelength selection. In contrast, the beam-combining element 3 not only has a simple structure but does not include such an expensive reflective film for wavelength selection, whereby the manufacturing cost can be reduced.

Furthermore, the number of optical elements for combining beams is significantly reduced in the rear-projection display apparatus 100 as compared to that in a rear-projection display apparatus of related art, whereby the volume occupied by the optical system can be reduced.

Furthermore, since various lasers or light-emitting diodes are used as the light sources 1 in the rear-projection display apparatus 100, extremely fine colors can be reproduced even on a large-sized screen.

Furthermore, the use of various lasers or light-emitting diodes as the light sources 1 in the rear-projection display apparatus 100 allows for miniaturization of the spot diameter (spot size=one pixel size) in the cross section of each emitted light beam. Thus, the light beam can be displayed as one pixel on the screen 6 without the application of Newton's image relations, whereby a sharper image can be displayed on the large-sized screen 6 as compared to that in a plasma display, a liquid-crystal display, or a projector of related art that performs display with fixed pixels.

Figure 6:
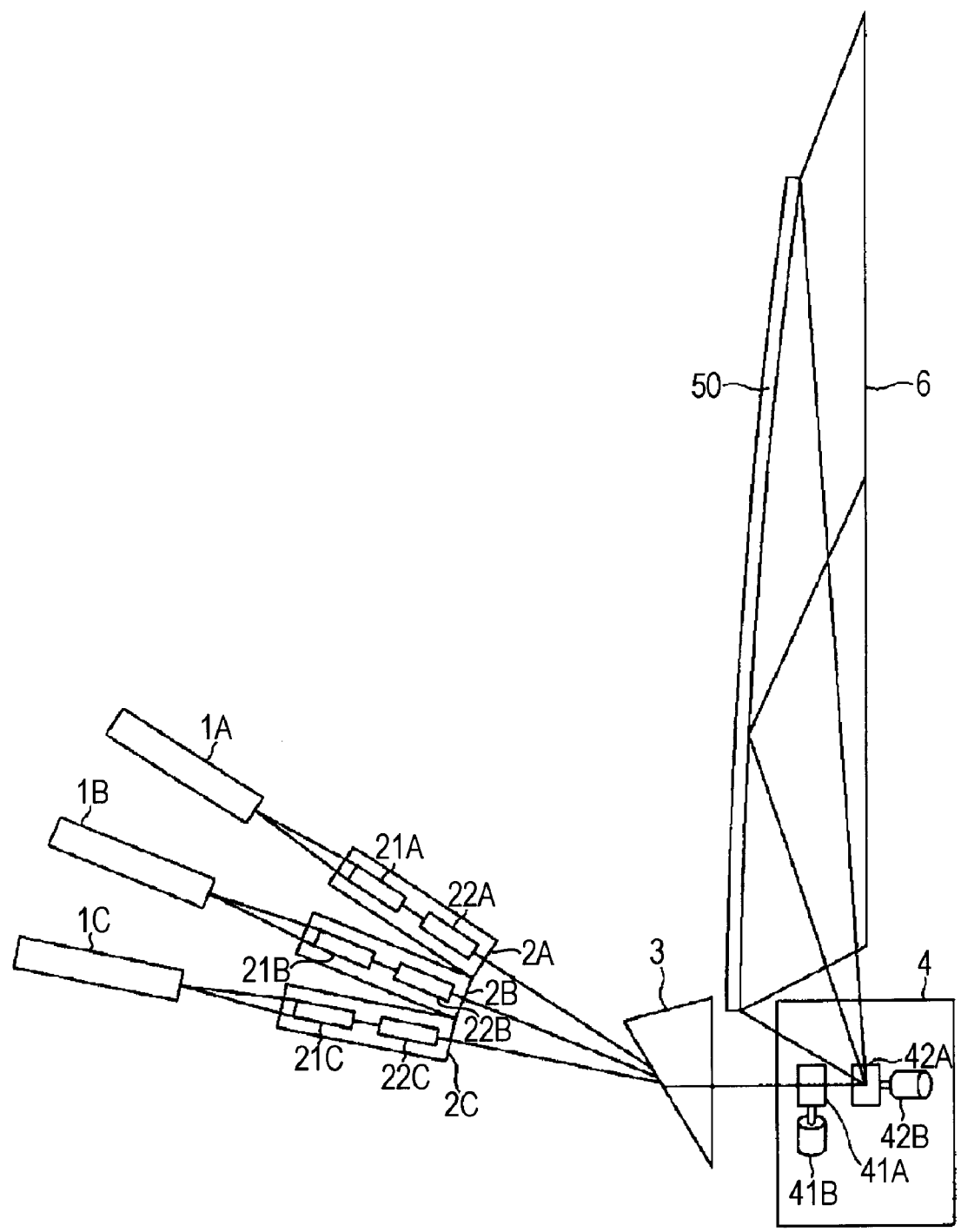
FIG. 6 illustrates an internal structure of a rear-projection display apparatus according to a second embodiment of the present invention.

FIG. 6 illustrates an internal structure of a rear-projection display apparatus 200 according to a second embodiment of the present invention. Components included in the rear-projection display apparatus 200 that are the same as those in the rear-projection display apparatus 100 are indicated by the same reference numerals, and descriptions of those components will not be repeated.

The rear-projection display apparatus 200 is equipped with a light-guiding mirror 50 for guiding light to the screen 6. The light-guiding mirror 50 has a toric surface which is concave with respect to the screen 6 and whose curvature in the vertical direction is greater than that in the horizontal direction.

By giving the light-guiding mirror 50 a concave toric surface, the difference in incidence angles among laser beams incident on the screen 6 can be reduced.

The shape of the light-guiding mirror 50 is not limited to the aforementioned shape. For example, the light-guiding mirror 50 may alternatively have a concave spherical surface, a concave free-form surface, or the like. If the light-guiding mirror 50 is given a concave spherical surface, for example, it is preferable to set the distance between the light-guiding mirror 50 and the screen 6 greater than that in a light-guiding mirror 50 having a concave toric surface or a concave freeform surface. Specifically, this greater-distance setting in the light-guiding mirror 50 having a concave spherical surface is for allowing the difference in incidence angles among laser beams incident on the screen 6 to be substantially the same as that in the light-guiding mirror 50 having a concave toric surface or a concave freeform surface.

In the rear-projection display apparatus 200 according to the second embodiment of the present invention described above, the difference in incidence angles among laser beams incident on the screen 6 can be reduced.

The technical scope of the present invention is not limited to the above embodiments, and modifications are permissible without departing from the scope of the claimed invention.

Specifically, in the above embodiments, each of the light sources 1A, 1B, and 1C directly modulates a laser beam from a semiconductor laser before emission.

Figure 7:
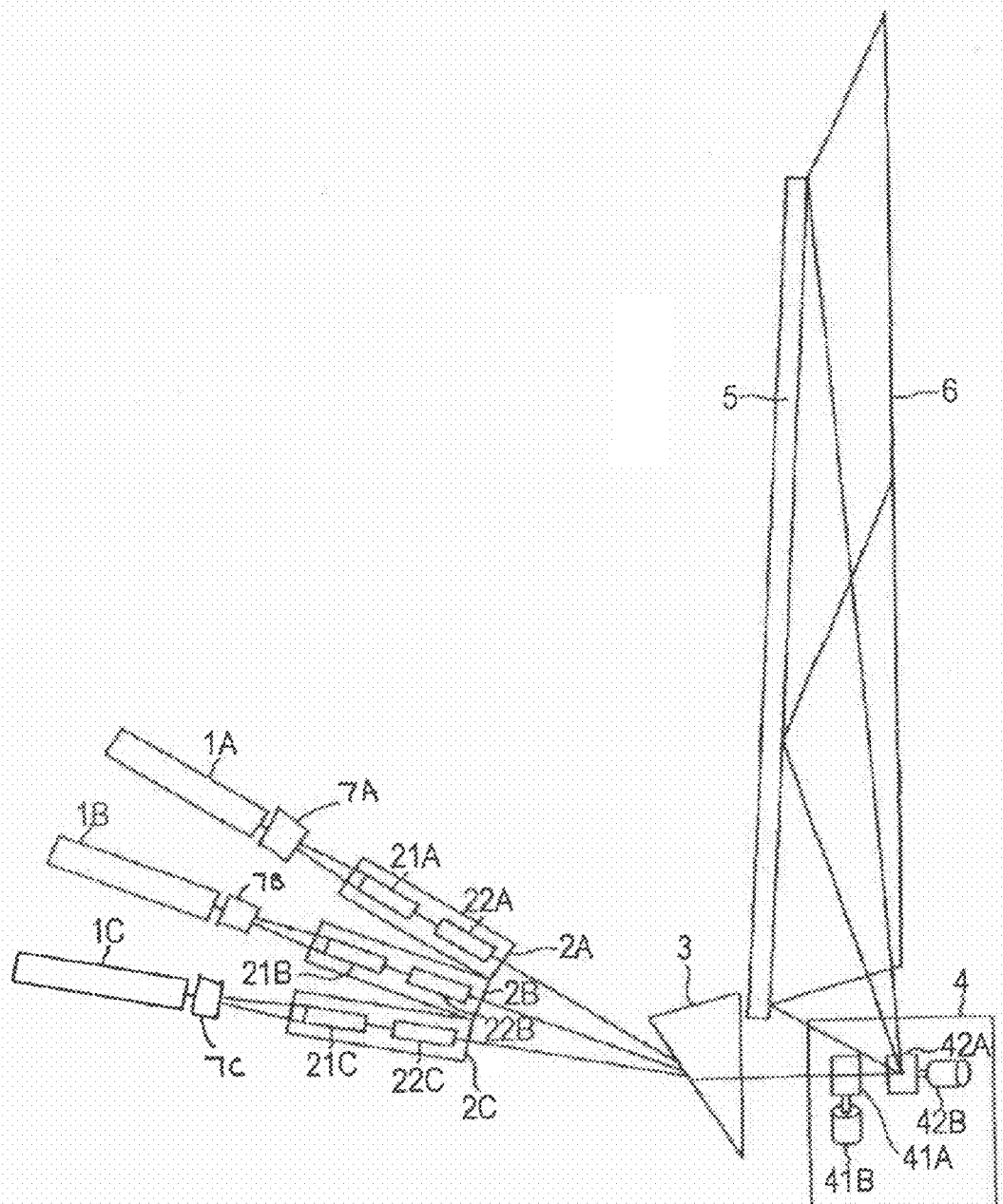
FIG. 7 illustrates an internal structure of a rear-projection display apparatus according to a third embodiment of the present invention.

FIG. 7 illustrates an internal structure of a rear-projection display apparatus 300 according to a third embodiment of the present invention. Components included in the rear-projection display apparatus 300 that are the same as those in the rear-projection display apparatus 100 are indicated by the same reference numerals, and descriptions of those components will not be repeated.

FIG. 7 illustrates an alternative embodiment including, for example, at least three modulation elements 7A, 7B, and 7C which modulate laser beams emitted respectively from at least three non-modulation light sources. As illustrated at FIG. 7, the at least three modulation elements 7A, 7B, and 7C may be disposed between the light source 1A and the optical unit 2A, between the light source 1B and the optical unit 2B, and between the light source 1C and the optical unit 2C, so that the modulated laser beams can be supplied to the respective optical units 2A, 2B, 2C. Alternatively, regardless of whether the modulation elements are disposed inside or outside the optical units 2A, 2B, 2C, the modulation elements may be disposed at any positions on the respective light paths.

Furthermore, in place of the beam-converting optical elements 22A, 22B, 22C provided in the above embodiments, for example, an alternative beam-converting optical element may be provided, which converts laser beams emitted from the beam-shaping optical elements 21A, 21B, 21C to a beam converged at a substantial focal point having a diameter of 1 mm or less on the screen 6.

As an alternative to the above embodiments, the scanning unit may be given a curved surface having a curvature that allows a beam to be converged at a substantial focal point upon entering the screen.

In the above embodiment, the light paths on which the light sources 1A, 1B, 1C and the optical units 2A, 2B, 2C are disposed extend in the depth direction behind the screen 6, as shown in FIG. 1. As an alternative embodiment, the light paths on which the light sources 1A, 1B, 1C and the optical units 2A, 2B, 2C are disposed may extend in a bent fashion in the vertical direction of the drawing. In this manner, the depth behind the screen 6 can be further reduced.

It should be understood by those skilled in the art that various modifications, combinations, sub-combinations and alterations may occur depending on design requirements and other factors insofar as they are within the scope of the appended claims or the equivalents thereof.

What is claimed is:

1. A projection display apparatus that projects an image on a screen, comprising:
   at least three light sources that emit light beams of different wavelengths;
   at least three optical units that convert the light beams emitted from the at least three light sources into substantially collimated light beams;
   a prism that combines the substantially collimated light beams from the at least three optical units into a single beam of light, each of the substantially collimated light beams received by the prism at a respective different angle with respect to an entry face of the prism and the single beam of light emitting from an exit face of the prism at an angle perpendicular to the exit face of the prism;

means for scanning the single beam of light emitted from the prism so as to allow the single beam of light to enter the screen; and a fixed light-guiding mirror that guides the single beam of light emitted from the means for scanning to the screen, a height of the light-guiding mirror being more than half of a height of the screen.

2. The projection display apparatus according to claim 1, wherein the image is projected on the screen from a rear side thereof.

3. The projection display apparatus according to claim 1, wherein the image is projected on the screen from a front side thereof.

4. The projection display apparatus according to claim 1, wherein the at least three light sources directly modulate the light beams before emitting the light beams.

5. The projection display apparatus according to claim 1, further comprising:

at least three modulation elements that modulate the light beams respectively emitted from the at least three light sources.

6. The projection display apparatus according to claim 1, wherein the at least three light sources include semiconductor lasers.

7. The projection display apparatus according to claim 1, wherein the at least three light sources include light-emitting diodes.

8. The projection display apparatus according to claim 1, wherein the means for scanning has a reflective surface, the means for scanning driving the reflective surface so as to scan the substantially collimated light beams over the screen in vertical and horizontal directions thereof.

9. The projection display apparatus according to claim 1, wherein the light-guiding mirror comprises a light-guiding mirror having a toric surface which is concave with respect to the screen.

10. The projection display apparatus according to claim 9, wherein a curvature of the light-guiding mirror having the toric surface is greater in a direction of the height of the light-guiding mirror having the toric surface than in a direction of the length thereof.

11. The projection display apparatus according to claim 1, wherein each of the optical units including a beam-shaping unit that shapes a beam of an elliptical cross section to a beam of a circular cross section and a beam-converting unit that substantially collimates a beam.

12. The projection display apparatus according to claim 1, wherein the means for scanning has a curved surface that allows a beam to be converged at a focal point.

13. A projection display apparatus that projects an image on a screen, comprising:

at least three light sources that emit light beams of different wavelengths;

at least three optical units that convert the light beams emitted from the at least three light sources into substantially collimated light beams;

a prism that combines the substantially collimated light beams from the at least three optical units into a single beam of light, each of the substantially collimated light beams received by the prism at a respective different angle with respect to an entry face of the prism and the single beam of light emitting from an exit face of the prism at an angle perpendicular to the exit face of the prism;

a scanning unit that scans the single beam of light emitted from the prism so as to allow the single beam of light to enter the screen; and a fixed light-guiding mirror that guides the single beam of light emitted from the scanning unit to the screen, a height of the light-guiding mirror being more than half of a height of the screen.

* * * * *